No. 847,789. PATENTED MAR. 19, 1907.
W. J. LA FLEUR.
ROLLER ATTACHMENT FOR SLED RUNNERS.
APPLICATION FILED APR. 19, 1906.
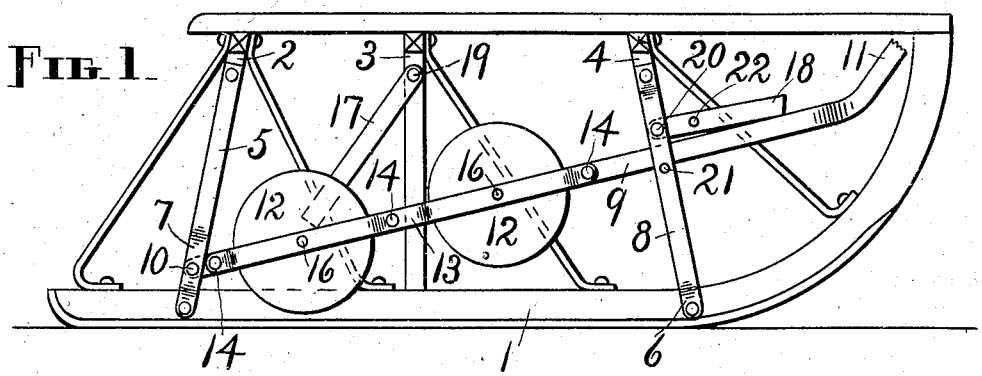
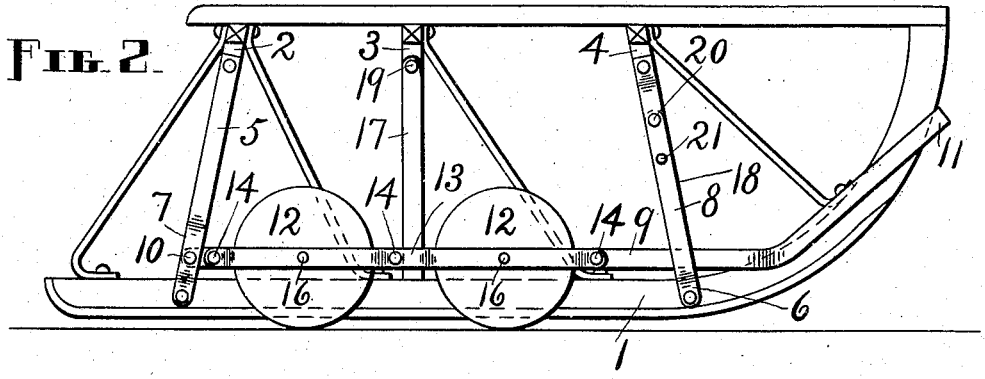
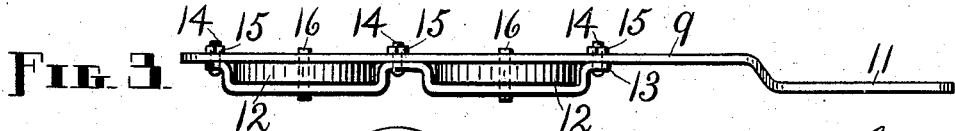
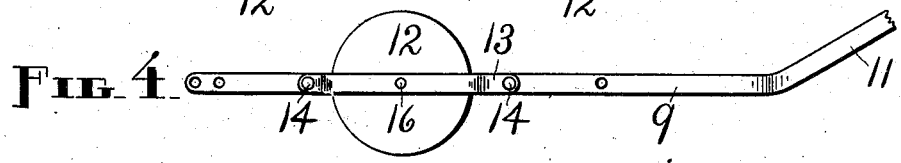
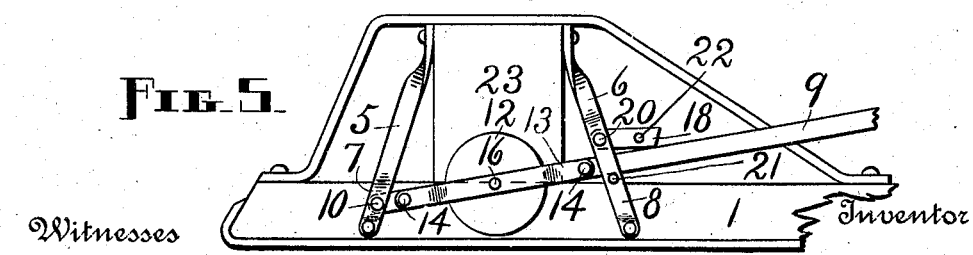
Witnesses
H. H. Cutter.
G. C. Fairbanks
Inventor
William J. La Fleur,
By Webster & Co.,
Attorneys

UNITED STATES PATENT OFFICE.

WILLIAM J. LA FLEUR, OF NORTHAMPTON, MASSACHUSETTS.

ROLLER ATTACHMENT FOR SLED-RUNNERS.

No. 847,789.      Specification of Letters Patent.      Patented March 19, 1907.

Application filed April 19, 1906. Serial No. 312,542.

*To all whom it may concern:*

Be it known that I, WILLIAM J. LA FLEUR, a citizen of the United States of America, residing at Northampton, in the county of Hampshire and State of Massachusetts, have invented a new and useful Roller Attachment for Sled-Runners, of which the following is a specification.

My invention relates to improvements in attachments for the runners of sleighs or sleds, more particularly truck-sleds used for carrying heavy loads, and comprises a lever provided with one or more rollers and pivoted at one end to a suitable support, one or more keepers, means to attach or connect the different members to or with a sled, and such other parts as may be required, all as hereinafter set forth.

The object of my invention is to provide a strong, durable, and comparatively simple and inexpensive roller attachment for a sled-runner which can be easily and quickly operated to lift the runner with which said attachment is connected clear of the ground, bridge, or other surface where there is no snow or ice, and thus hold it while the sled is drawn forward in the manner of a wheeled vehicle, thereby obviating the frictional resistance that would otherwise be present, and which can be as easily and quickly operated to lower said runner after the bare place has been passed. It will be understood that each runner of a sled is equipped with one of the devices or attachments. I attain this object by the means illustrated in the accompanying drawings, in which—

Figure 1 is a side view of a sled having my device attached thereto, the rollers being elevated and in their inoperative position; Fig. 2, a similar view showing the rollers depressed in their operative position; Fig. 3, a plan view of the operating-lever and rollers, said lever being detached; Fig. 4, a side view of the lever detached, one roller instead of two being here provided; and Fig. 5, a side view of a portion of a different kind of sled from that illustrated in the first two views, having the device shown in said views adapted and attached thereto.

Similar figures refer to similar parts throughout the several views.

Referring first to Figs. 1 and 2, one side of a sled is shown, comprising in part a runner 1 and three uprights or supports 2, 3, and 4. Straps 5 and 6, offset at 7 and 8, respectively, to accommodate an operating-lever 9, are fastened at their upper ends to the supports 2 and 4, respectively, and at their lower ends to the runner 1. The lever 9 has its rear terminal pivoted at 10 to the strap 5 and support 2 and has its forward part confined between the strap 6 and support 4, the arrangement being such that said lever can move up and down between the last-mentioned strap or its offset 8 and the support 4. The front terminal 11 of the lever 9 is preferably offset, as best shown in Fig. 3, and bent upward at an angle with the main portion of said lever to facilitate grasping the same for the purpose of operating the lever. Rollers 12 12 are connected with the lever 1 by means of an angular strap 13, secured to said lever by three bolts 14 and nuts 15, the trunnions 16 of each of said rollers being received into suitable openings in the lever and strap. Keepers 17 and 18 for the operating-lever are provided, the first of these keepers having its upper end pivoted at 19 to the support 3 and the second keeper being pivoted at 20 to the offset 8 and the adjacent support 4, between which two members such keeper swings. There are openings in the offset 8, the keeper 18, and the support 4, which aline when said keeper is down to receive a locking-pin 21, the opening in the keeper being shown at 22 in Fig. 1.

The rollers 12 are retained in their elevated or inoperative position by the pin 21, which is inserted in the offset 8 and support 4 and projects outward to receive the lever 9, as shown in the first view, the free ends of the keepers 17 and 18 resting meanwhile on the upper edge of said lever. To bring the rollers 12 into contact with a road-bed or other surface and lift the runner 1 above such road-bed or surface, withdraw the pin 21 and grasp the lever at 11 and depress the same until the keepers 17 and 18 drop into place over said lever, then reinsert said pin in the offset 8 and support 4, this time passing it also through the keeper 18. The lever is now held securely in a substantially horizontal position with the rollers below the bottom edge of the runner, so that the latter rides upon wheels, as it were. The keeper 17 stands perpendicular, and the keeper 18 is held by the pin in a nearly vertical position. Thus three strong bearings, including the pivot 10, are afforded the lever or the side of the sled relative to the lever and rollers. To return the parts to their inoperative position, simply withdraw the pin, swing the keepers out of the path of the lever, swing the latter upward, and again insert said pin beneath said lever.

A pin or other suitable fastening device may of course be provided for the keeper 17; but ordinarily such provision is not necessary.

In case only one roller 12 is required to be used in connection with the lever 9 the long strap 13 may be removed and a shorter strap substituted therefor, as shown in Fig. 4, the trunnions of said roller being inserted in the openings formerly occupied by the central bolt 14, and the bolts for this strap passing through the openings formerly occupied by the trunnions of the two rollers. If desired, the single roller can be placed where either of those shown in the aforesaid views is located, or, in other words, either one of the latter may be omitted.

In Fig. 5 I show a knee 23 mounted on the runner and a connected attachment very similar to that already fully described, except that here the straps 5 and 6 extend between said knee and said runner and there is no keeper 17. One roller only appears; but the device might easily be made for two rollers. The operation of this form of construction does not differ materially from that of the other form.

I do not wish to be limited to any particular number of rollers in any given attachment, nor to the specified kind of fastening means for the keepers, and I desire to include within the scope of my invention any and all modifications which justly fall within the terms of my claims.

What I claim as my invention, and desire to secure by Letters Patent, is—

1. An attachment, for a sled-runner, comprising confining-straps adapted to be suitably supported one in advance of the other lengthwise of the sled on the outside of the same, a lever pivoted at one end to one of said straps and guided by the other of said straps, and a roller carried by said lever outside of the runner.

2. The combination, in an attachment for sled-runners, with a sled, of confining-straps suitably supported one in advance of the other lengthwise of said sled on the outside of the same, a lever having one end pivoted to one of said straps and being guided by the other of said straps, a roller carried by said lever outside of one of the sled-runners, and means to retain the lever in its elevated position and to release it from such position.

3. The combination, in an attachment for sled-runners, with a sled, of confining-straps, suitably supported on the outside of said sled, a lever having one end pivoted to one of said straps and being guided by the other of said straps, a roller carried by said lever, and a keeper pivotally connected with one of the confining-straps and adapted to retain the lever in its depressed position.

4. The combination, in an attachment for sled-runners, with a sled, of confining-straps, suitably supported on the outside of said sled, a lever having one end pivoted to one of said straps and being guided by the other of said straps, a roller carried by said lever, a keeper pivotally connected with one of the confining-straps and adapted to retain the lever in its depressed position, and means for holding the free end of said keeper in place while the keeper is in operative engagement with the lever.

5. The combination, in an attachment for sled-runners, with a sled, of confining-straps, suitably supported on the outside of said sled, a lever having one end pivoted to one of said straps and being guided by the other of said straps, a roller carried by said lever, and a keeper pivoted at one end to a suitable support between the aforesaid straps and adapted to retain the lever in its depressed position.

WILLIAM J. LA FLEUR.

Witnesses:
F. A. CUTTER,
ALLEN WEBSTER.